INVENTOR
F. C. YOUNG
BY
Stephen B Judlowe
ATTORNEY

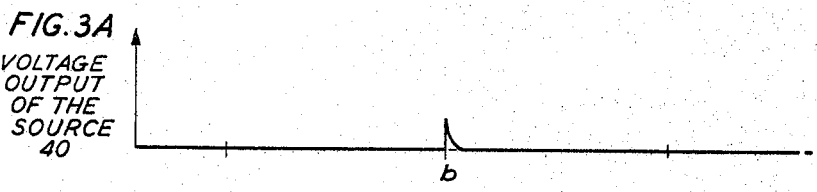
FIG. 3A VOLTAGE OUTPUT OF THE SOURCE 40
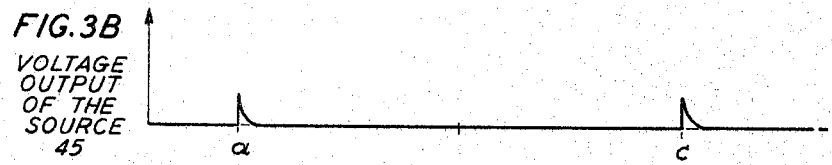
FIG. 3B VOLTAGE OUTPUT OF THE SOURCE 45
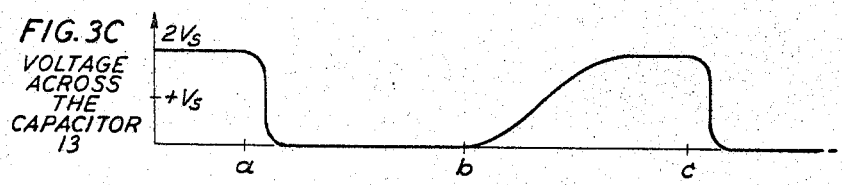
FIG. 3C VOLTAGE ACROSS THE CAPACITOR 13
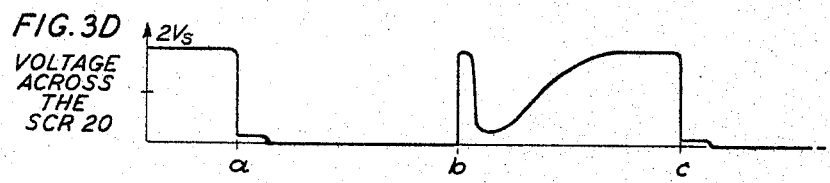
FIG. 3D VOLTAGE ACROSS THE SCR 20
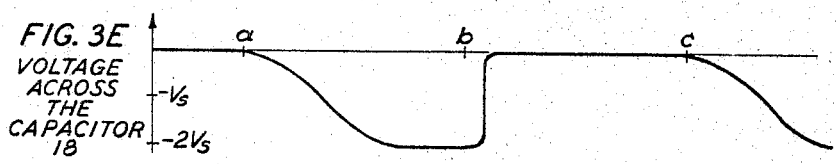
FIG. 3E VOLTAGE ACROSS THE CAPACITOR 18
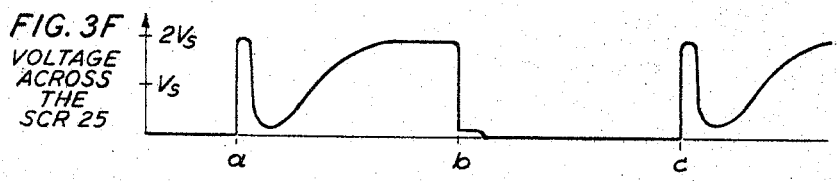
FIG. 3F VOLTAGE ACROSS THE SCR 25
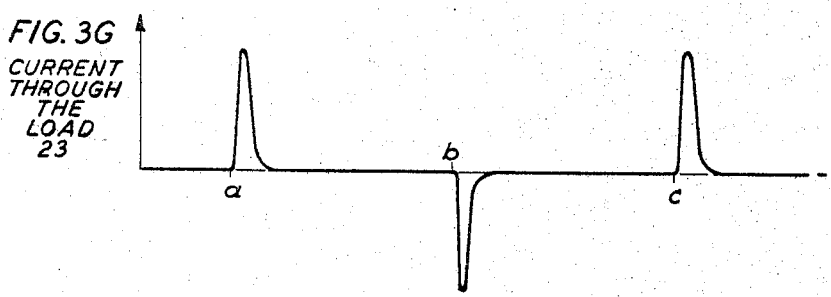
FIG. 3G CURRENT THROUGH THE LOAD 23

United States Patent Office 3,435,256
Patented Mar. 25, 1969

3,435,256
ALTERNATING POLARITY CURRENT DRIVER USING CASCADED ACTIVE SWITCHING ELEMENTS
Frederick C. Young, New Vernon, N.J., assignor to Bell Telephone Laboratories, Incorporated, New York, N.Y., a corporation of New York
Filed Jan. 17, 1966, Ser. No. 521,117
Int. Cl. H03k 1/14
U.S. Cl. 307—262      8 Claims

ABSTRACT OF THE DISCLOSURE

A bipolar driver circuit is developed for producing alternate polarity current pulses from a circuit in which four cascaded silicon-controlled rectifiers resonantly charge two capacitors and alternately discharge the capacitors in an opposite polarity relationship through a ferrite load connected to a central junction in the cascade of rectifiers.

---

Figure 1:
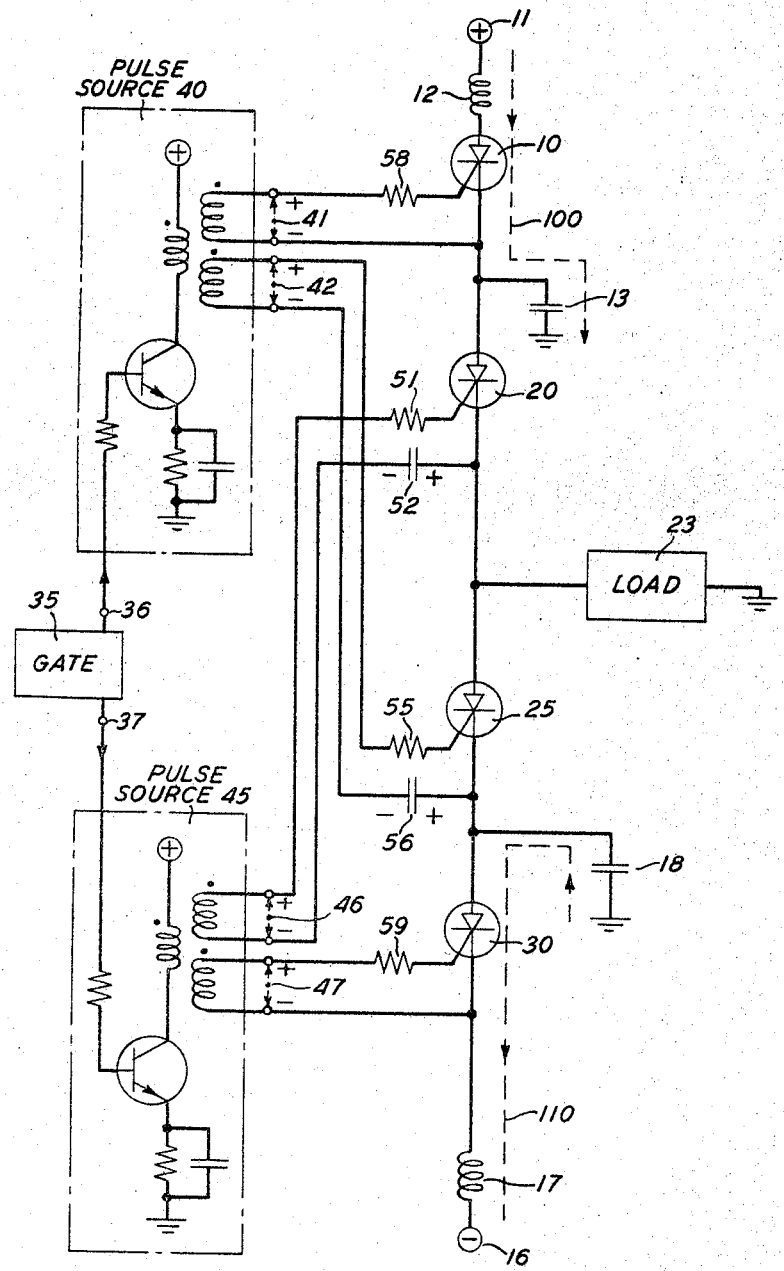

This invention relates to electronic driver circuits and, more specifically, to an arrangement for supplying relatively large current pulses to a load in an alternating polarity relationship.

Many system applications of present-day interest require a circuit organization which supplies a sequence of relatively large alternating polarity current pulses. For example, microwave waveguide attenuators and phase shifters loaded with a square loop ferromagnetic material employ such an arrangement to switch the ferrite between its alternate remanent hysteresis orientations.

However, prior art bipolar current pulsers are characterized by relatively complex circuit configurations which, moreover, operate in a relatively inefficient manner. Further, the peak currents available from such arrangements are restricted. In addition, where silicon controlled rectifiers have been employed to gate an output current, the rectifiers have been subjected to large potential stresses.

It is therefore an object of the present invention to provide an improved current pulsing arrangement.

More specifically, an object of the present invention is the provision of a circuit organization for supplying relatively large current pulses in an alternating polarity relationship.

Another object of the present invention is the provision of a bipolar current pulsing arrangement which exhibits a relatively high power efficiency.

Still another object of the present invention is the provision of a bipolar current pulser which is highly reliable, and which may be relatively simple and inexpensively constructed.

These and other objects of the present invention are realized in a specific illustrative bipolar current pulsing arrangement which includes four cascaded, series-aiding silicon controlled rectifiers. The exterior two rectifiers are operative to resonantly charge two capacitors respectively associated therewith, with the two interior devices being employed to alternately discharge the capacitors in an opposite polarity relationship through a load connected to their common junction.

It is thus a feature of the present invention that a current pulsing arrangement include first and second cascaded silicon controlled rectifiers, a load connected to the common junction between the two rectifiers, first and second capacitors respectively connected to the first and second rectifiers, circuitry including a third silicon controlled rectifier for resonantly charging the first capacitor, circuitry including a fourth silicon controlled rectifier for resonantly charging the second capacitor, and first and second control sources for respectively energizing the first and fourth rectifiers, and the second and third rectifiers.

It is another feature of the present invention that a bipolar current pulse generator employ a plurality of silicon controlled rectifiers operated with conservative potential stresses.

A complete understanding of the present invention and of the above and other features, advantages and variations thereof may be gained from a consideration of the following detailed description of an illustrative embodiment thereof presented hereinbelow in conjunction with the accompanying drawing in which:

FIG. 1 is a schematic diagram of an illustrative bipolar current pulsing arrangement which embodies the principles of the present invention; and FIGS. 2A and 2B, and 3A through 3G comprise timing diagrams depicting the voltage and current waveforms characterizing selected circuit components included in the organization shown in FIG. 1.

Referring now to FIG. 1, there is shown a specific illustrative bipolar current pulser for supplying relatively large current pulses in an alternating polarity sequence to a load 23. The arrangement includes four series-aiding silicon controlled rectifiers 10, 20, 25 and 30, with the load 23 being grounded at one end, and connected at its other end to the junction between the two central rectifiers 20 and 25. Similarly, two capacitors 13 and 18 have one grounded terminal, with the other terminals thereof being respectively connected to the junctions between the rectifiers 10 and 20, and the devices 25 and 30.

Two pulse sources 40 and 45 are employed to supply relatively narrow voltage transients to the output ports 41 and 42, and 46 and 47 respectively included therein in a polarity indicated in FIG. 1. The voltage pulses appearing at the ports 41, 42, 46 and 47 are respectively employed to render the rectifiers 10, 25, 20 and 30 conductive. Further in this regard, a gate 35 is employed to alternately enable the pulse sources 40 and 45 by supplying alternate energization to two output terminals 36 and 37 thereon. The pulse sources 40 and 45 may advantageously comprise transformer coupled switched transistors, as shown in the drawing, while the gate 35 may comprise a pulse source and a cascaded two-state counter. Alternatively, the gate 35 may embody a Boolean logic function generator for selectively energizing the terminals 36 and 37.

Finally, positive and negative potential sources 11 and 16, respectively characterized by positive and negative output voltages of plus and minus $V_s$ volts, are connected to the rectifiers 10 and 30 by two inductors 12 and 17. The remaining circuit elements shown in the drawing, i.e., the resistors 51, 55, 58, and 59, and the capacitors 52 and 56, supplement the operation of the above-enumerated basic circuit components in a manner considered hereinafter.

Each of the silicon controlled rectifiers 10, 20, 25 and 30 is characterized by a very high impedance in its nonconducting state. If the gate terminal thereof is pulsed with a positive signal while a positive potential persists across the anode and cathode terminals thereof, the rectifier will be rendered conductive in a unidirectional mode, thereby presenting a very low impedance to the external circuit. Correspondingly, a conducting device is characterized by a very low potential drop thereacross.

After conduction is initiated in a rectifier, the gate terminal thereof has very little control over the device. Conduction will persist in an energized rectifier until the current flowing therethrough falls below a minimum threshold level, or attempts to reverse polarity.

As an integral part of the circuit functioning for the FIG. 1 arrangement, the capacitors 13 and 18 are respectively charged to a voltage of plus or minus $2V_s$ volts through a resonant charging operation. To illustrate this process for the capacitor 13, assume that the rectifiers 10 and 20 are initially nonconductive and that the capacitor 13 is initially uncharged, as shown prior to a time $x$ shown in FIG. 2A. At the time $x$, let the pulse source 40 energize the gate terminal of the rectifier 10 via the port 41. The device 10 is thereby rendered conductive, and exhibits a relatively low, negligible anode-cathode potential. Accordingly, the current $i(t)$ which flows from the source 11 through the inductor 12 and the rectifier 10 to the capacitor 13, which current path is indicated by a dashed vector 100 in FIG. 1, may be closely approximated in differential form:

$$V_s = L\frac{di(t)}{dt} + \frac{1}{C}\int i(t)dt \quad (1)$$

where L and C respectively comprise the inductance and capacitance values characterizing the circuit elements 12 and 13, respectively. Employing the zero energy storage initial condition and solving the differential Equation 1 yields $$i(t) = V_s\sqrt{\frac{C}{L}} \sin\left[\sqrt{\frac{1}{LC}}(t-x)\right] \quad (2)$$

Using the relationship $$v(t) = \frac{1}{C}\int_x^t i(t)dt \quad (3)$$

to find the potential $v(t)$ across the capacitor 13 results in $$v(t) = V_s\left\{1 - \cos\left[\sqrt{\frac{1}{LC}}(t-x)\right]\right\} \quad (4)$$

Immediately following the enabling energization supplied by the pulse source 40 at the time $x$, the voltage $v(t)$ across the capacitor 13 and the current $i(t)$ through the above-identified series path are respectively given by the functional relationships of Equations 4 and 2 for one-half of a cycle, i.e., for $x < t < x + \pi\sqrt{LC}$. These voltage and current waveshapes are respectively illustrated in FIGS. 2A and 2B for the interval between the times $x$ and $x + \pi\sqrt{LC}$. After the time $t = x + \pi\sqrt{LC}$, the voltage $v(t)$ levels out at a value of $v(t) = 2V_s$.

Figure 2A:
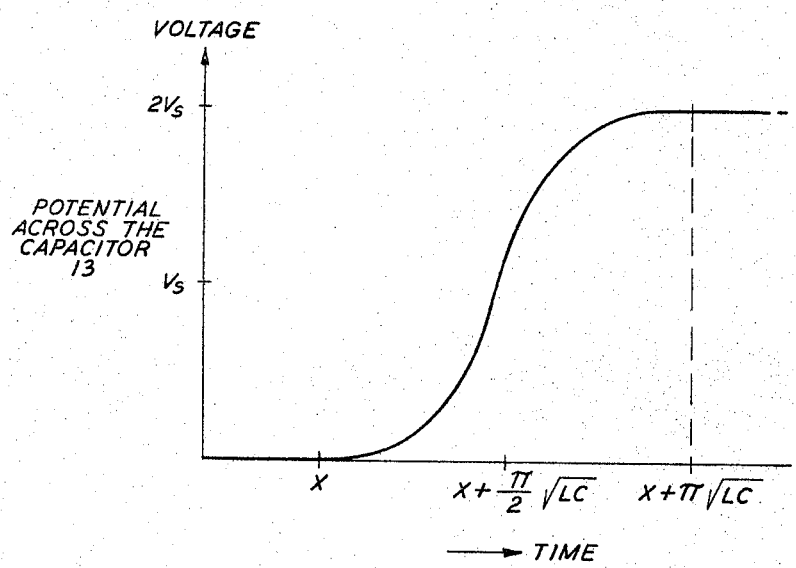
Figure 2B:
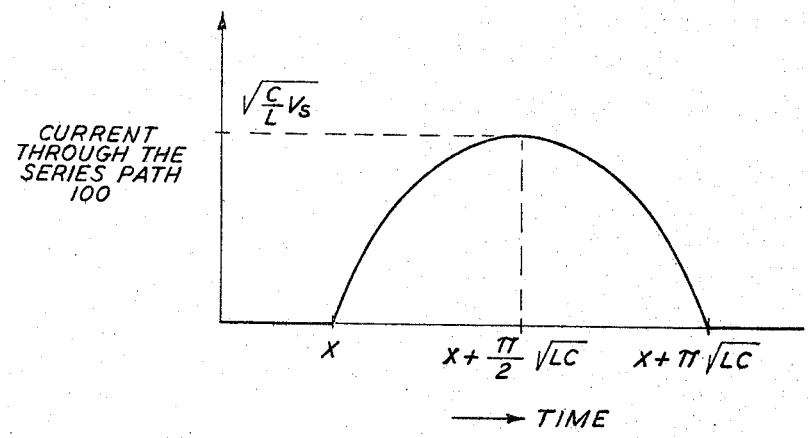

However, following the time $x + \pi\sqrt{LC}$, Equation 2 would indicate that the current $i(t)$ should be negative, i.e., reverse polarity, and should flow through the rectifier 10 in a direction opposite to the vector 100. Since the rectifier 10 is a unidirectional conducting device, it will not permit reverse conduction therethrough and, accordingly, becomes an open circuit following the time $x + \pi\sqrt{LC}$. Hence, the current $i(t)$ is zero following the instant $x + \pi\sqrt{LC}$, as shown in FIG. 2B.

Further, the voltage present across the capacitor 13 at the instant $x + \pi\sqrt{LC}$, i.e., $2V_s$, is retained by the element 13 since the upper end thereof is electronically isolated by the nonconducting silicon controlled rectifiers 10 and 20. This constant potential $2V_s$ for the capacitor 13 is depicted in FIG. 2A following the instant $x + \pi\sqrt{LC}$.

Hence, it is observed that the voltage source 11 has been shown to charge the capacitor 13 to twice the source output potential and, moreover, to be theoretically 100 percent efficient since the charging path did not include any power dissipating resistive impedance. In this regard, the peak current through the path 100 during the charging processes, viz, $$\sqrt{\frac{C}{L}}V_s$$

was limited by reactive, and not resistive circuit components.

With the above general circuit considerations in mind, the detailed operation of the FIG. 1 bipolar current pulser will now be considered. Assume for initial conditions that the gate 35 has last energized the pulse source 40, such that the capacitors 13 and 18 are respectively initially charged to $2V_s$ and zero volts, as shown prior to a time $a$ in FIGS. 3C and 3E. At the time $a$, let the gate 35 energize the pulse source 45 hence applying the voltage pulse shown in FIG. 3B to the source output ports 46 and 47.

The pulse at the port 47 energizes the gate terminal of the silicon controlled rectifier 30, thereby giving rise to a resonant charging current which flows through a series path indicated by a vector 110 in FIG. 1. Accordingly, the capacitor 18 is resonantly charged to a potential of $-2V_s$ volts by circuit functioning which identically parallels the charging processes described above regarding the capacitor 13 and FIGS. 2A and 2B. This charging operation for the capacitor 18 following the time $a$ is shown in FIG. 3E.

The pulse present at the time $a$ at the source 45 output port 46 is operative to render the rectifier 20 conductive, thereby effectively impressing the capacitor 13 potential of $2V_s$ volts directly across the load 23. The amplitude of the resulting positive current pulse flowing toward ground through the load 23 is quite large for reasonably small impedances, e.g., those presented by a conductor inductively coupled to a ferrite material. In addition, the duration and waveshape of the load current depends upon the load impedance and may comprise, for example, a resistance-capacitive discharge for purely resistive loads or one-half period of a sinusoid for a predominantly inductive load. A representative load current pulse for a relatively small load impedance (compared to that of the inductors 12 or 17) is shown in FIG. 3G following the time $a$. Also, the discharge of the capacitor 13 following the time $a$ is shown in FIG. 3C.

The voltage stress across the nonconducting rectifier 25 during the positive pulsing of the load 23 following the time $a$ is shown in FIG. 3F. This potential is the algebraic sum of the rectifier 25 anode and cathode potentials which respectively comprise the voltage across the capacitor 13 (since the rectifier 20 is conductive for the interval of interest) and the voltage across the capacitor 18. Immediately following the time $a$, the composite rectifier 25 anode-cathode voltage follows that of the capacitor 13 since the capacitor 18 is being charged from an initial zero voltage condition relatively slowly in comparison with the rapid discharge of the capacitor 13 through the load 23. Thereafter, when the capacitor 13 is nearly discharged, the potential across the silicon controlled rectifier 25 follows the charging curve for the capacitor 18.

It is observed from the above that the voltage across the rectifier 25 does not exceed $2V_s$, which is the effective source potential being employed for load energization in the FIG. 1 arrangement. This is an improvement by a factor of two over the $4V_s$ potential stresses employed in prior art arrangements which connect a fixed value potential source directly to the cathode of the rectifier 25 (and also to the anode of the rectifier 20). Since the cost of silicon controlled rectifiers depends greatly upon their ability to withstand voltage stresses while in a nonconductive state, the configuration of FIG. 1 may advantageously employ less expensive devices.

To review the above-considered circuit operation following the time $a$, the enabled pulse source 45 causes the rectifier 20 to discharge the capacitor 13 through the load 23. Coincidentally therewith, the source 45 initiates a resonant charging of the capacitor 18 to a voltage of $-2V_s$ volts. Hence, the assumed initial storage conditions for the capacitors 13 and 18 have been reversed, with only the latter element now being charged.

When the gate 35 next causes the pulse source 40 to supply an energization to the ports 41 and 42 at a time $b$ shown in FIG. 3A, circuit functioning corresponding to that described above is effected. In particular, the activated port 42 renders the rectifier 25 conductive, thereby discharging the negatively charged capacitor 18 through the load 23 causing a negative current to flow in a rightto-left direction therethrough, as indicated in FIG. 3G. Also, the pulse at the port 41 enables the rectifier 10, hence causing a resonant charging of the capacitor 13, as shown following the time $b$ in FIG. 3C. Further, the voltage stress across the nonconducting rectifier 20 is illustrated in FIG. 3D, and does not exceed the $2V_s$ effective circuit source potential. Hence, following the above-described circuit sequencing, the system again resides in its initial state, and will respond to new output signals from the source 45 in the manner considered hereinabove with respect to circuit operation following the time $a$. Such circuit sequencing is shown in FIGS. 3B through 3G following a time $c$ included therein.

Thus, the FIG. 1 arrangement has been shown by the above to respond to consecutive pulses produced by the gate circuit 35 for supplying relatively large current pulses in an alternating polarity relationship to the load 23.

With regard to the circuit components in series with the gate terminals of the silicon controlled rectifiers 10, 20, 25 and 30, it is noted that the resistors 51, 55, 58 and 59 are employed to limit the current which flows through a driven rectifier gate junction. The capacitors 52 and 56, on the other hand, are utilized to improve the turn-off characteristic for the rectifiers 20 and 25. More specifically, the capacitors 52 and 56 have a small negative potential impressed therein when the associated rectifier gate terminal is energized. When the rectifiers 20 and 25 are being turned off, the process is somewhat speeded up by the presence of this negative gate potential.

It is to be understood that the above-described arrangement is only illustrative of the application of the principles of the present invention. Numerous other arrangements may be devised by those skilled in the art without departing from the spirit and scope thereof. For example, the rectifiers 10, 20, 25 and 30 may be replaced with other switched active elements operated within their current propagating capacities.

What is claimed is:

1. In combination, first and second cascaded silicon controlled rectifiers with a junction point therebetween, first and second capacitors respectively connected to said first and second rectifiers, means including a third silicon controlled rectifier for resonantly charging said first capacitor, means including a fourth silicon controlled rectifier for resonantly charging said second capacitor, and a load connected between said junction point and a reference potential, said first capacitor being charged to a first polarity with respect to said reference potential and said second capacitor being charged to a second polarity with respect to said reference potential.

2. The combination as in claim 1 further comprising first and second control sources for respectively energizing said first and fourth rectifiers, and said second and third rectifiers.

3. In combination, first and second series aiding switched active elements with a junction point therebetween, first and second capacitors respectively connected to said first and second active elements, means including a third switched active element for resonantly charging said first capacitor, means including a fourth switched active element for resonantly charging said second capacitor, and a load connected between said junction point and a reference potential, said first capacitor being charged to a first polarity with respect to said reference potential and said second capacitor being charged to a second polarity with respect to said reference potential.

4. The combination as in claim 3 further comprising first and second control sources for respectively energizing said first and fourth active elements and said second and third active elements.

5. The combination as in claim 1 wherein said first control source simultaneously energizes the first and fourth active elements, and said second control source, in alternation with said first control source, simultaneously energizes the second and third active elements.

6. The combination as in claim 3 further comprising means for alternately enabling said first and second active elements for respectively discharging said first and second capacitors.

7. The combination as in claim 6 wherein said load connected to said junction point switches into a first state in response to discharge current from the first capacitor and switches into a second state in response to discharge current from the second capacitor.

8. The combination as in claim 7 wherein said load comprises a square loop magnetic material.

References Cited

UNITED STATES PATENTS

| | | | |
|---|---|---|---|
| 3,192,401 | 6/1965 | Gray | 307—88.5 |
| 3,243,729 | 3/1966 | Olson et al. | 331—117 |
| 3,248,634 | 4/1966 | Fudaley et al. | 321—2 |
| 3,324,313 | 6/1967 | Soroka | 307—88.5 |

ARTHUR GAUSS, *Primary Examiner.*

S. D. MILLER, *Assistant Examiner.*

U.S. Cl. X.R.

307—246, 252, 270; 328—67